United States Patent Office 3,530,362
Patented Sept. 22, 1970

3,530,362
CONVERTER SUBSTATION FOR DIRECT
CURRENT POWER TRANSMISSION
Alexei Nikolaevich Filimonov, Ordinarnaya ulitsa 20, kv. 54, Mark Borisovich Kegeles, Ulitsa Dekabristov 30, kv. 26, and Pavel Aronovich Malkin, Prospekt Maxima Gorkogo 47, kv. 31, all of Leningrad, U.S.S.R.
Filed Mar. 4, 1968, Ser. No. 710,392
Int. Cl. H02m *1/18;* H02j *7/00, 1/00*
U.S. Cl. 321—11                         6 Claims

ABSTRACT OF THE DISCLOSURE

A converter substation for direct current power transmission comprises a plurality of converter blocks interconnected in series with one another and with an additional stand-by converter block adapted for selectively being switched in series with the converter blocks in place of constant grounding of the substation, there being grounding commutating devices for shunting the stand-by block from both sides, one of the grounding commutating devices being disconnected in the event of failure of any of the converter blocks which is cut into the same pole of the substation.

---

The present invention relates to converter substations for direct current transmission, preferably, high-voltage direct current transmission.

For increasing the reliability of operation of high voltage direct current transmission lines now in operation or those being developed, use is made in the present state of the art of stand-by equipment of converter blocks. The term "converter block" is used here and hereafter to denote a set comprising rectifiers, e.g. mercury-arc rectifiers connected in known manner, e.g. three-phase bridge, a converter transformer connected to an A.C. network at one side and to rectifiers at the other side, a circuit-breaker connecting the transformer to the A.C. network, control, protection and measuring devices, a device for potential equalizing disconnect switches and insulation.

In hitherto known converter substations for direct current transmission made of series-connected converter blocks, the stand-by equipment parts (rectifiers, transformers, auxiliary equipment) are not assembled into converter blocks.

In case of trouble with the equipment comprised in a block, this block is disconnected and the faulty unit in it is replaced by a new one.

The replacement procedure requires a considerable time during which the faulty transmission block is inoperative and the power being transmitted is reduced for the time of repairs. Many transmission lines, especially high- and super-high voltage ones, transmit a considerable power, and therefore shortage of power during the period of repairs of the faulty block is considerable, which involves a substantial economic damage.

It is an object of the present invention to eliminate the above disadvantages and improve the dependability of direct current transmission.

Said object is attained due to the fact that for the replacement of any faulty working blocks of the converter substation for direct current transmission which employs series-connected converter blocks, according to the invention, the substation incorporates an additional stand-by converter block, which is connected in series with the converter blocks in the place of constant grounding and normally shunted on both sides by means of grounding commutating devices, one of which is disconnected in case of failure of any of said converter blocks connected to the same pole of the substation.

If the converter substation is made as a two-pole substation with a grounded middle point, it is expedient, that the stand-by block should be connected to said point.

If the converter substation is made as a single-pole one according to a "pole-ground" circuit, then it is preferable that the stand-by block should be connected to the grounded end of the substation.

If the constant grounding is effected outside the substation, by means of a ground insulated cable or lead, then the grounding commutating devices may be connected to said cable (lead).

Given hereinbelow is a description of exemplary embodiments of the invention to be had in conjunction with the accompanying drawings, wherein.

Figure 1:
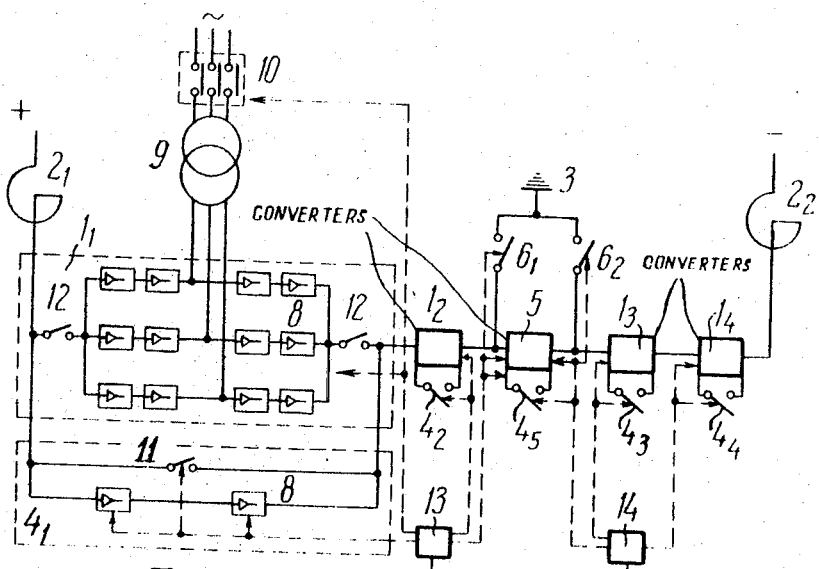
FIG. 1 shows the principal circuit diagram of a two-pole converter substation for direct current transmission, with a stand-by block.

In FIG. 1 working converter blocks $1_1$, $1_2$, $1_3$ and $1_4$ are shown to be connected in series, two in each pole (arm) of the transmission substation.

Through choke coils $2_1$ and $2_2$ the substation operates a cable line or an aerial line.

The middle point of the substation circuit is grounded through a constant grounding 3.

Each of the working blocks $1_1$–$1_4$ which consists of rectifiers, a rectifier transformer connected to the alternating-current mains and auxiliary equipment is provided with a respective short-circuiting device $4_1$, $4_2$, $4_3$, $4_4$, made, e.g., of rectifiers.

The working blocks $1_1$–$1_4$ are the same as one another. FIG. 1 shows a schematic diagram of block $1_1$. The working block consists of rectifiers 8, e.g. mercury-arc rectifiers, connected, for example, as a three-phase bridge, a converter transformer 9 connected at one winding to a three-phase A.C. network via the circuit-breaker 10 and to rectifiers 8 by the other winding, control, protection and measuring devices, a device for potential equalizing, disconnect switches 12 to disconnect converters without current break, when short-circuiting device $4_1$ is switched on.

Figure 2:
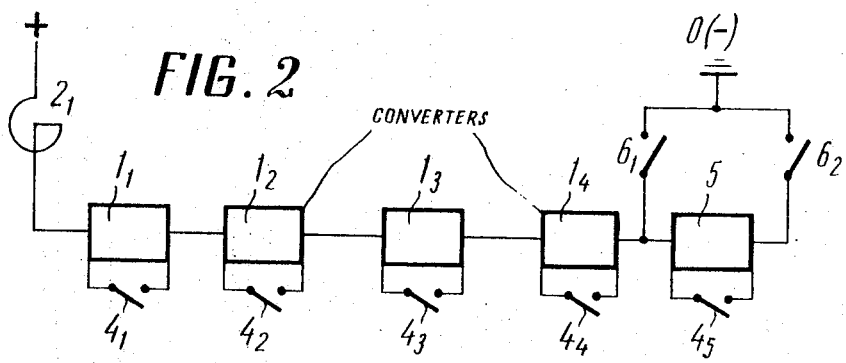
FIG. 2 shows the principal circuit diagram of a single-pole converter substation for direct current transmission, made according to a "pole-ground" circuit and provided with a stand-by block.
Figure 3:
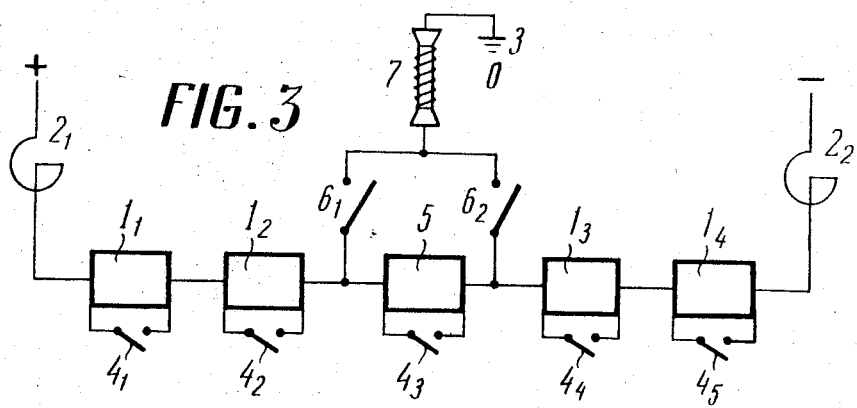
FIG. 3 shows the principal circuit diagram of a single-pole converter substation for direct current transmission, provided with grounded (zero) cable or lead and with a stand-by block.

The circuit diagram of the converter blocks shown in FIGS. 2 and 3 is the same as that for the block $1_1$ shown in FIG. 1.

Short-circuiting devices $4_1$–$4_5$ are identical. They may be made as shown in FIG. 1, for example, as series-connected rectifiers 8 with parallel-connected commutating device 11 for operation without current break with its own control device.

The short-circuiting device is connected in parallel with the converter block and it serves for short-circuiting of the block after fault. The short-circuiting device may be made as two parallel blocks, each of which is a short-circuiter in relation to the other.

According to the present invention, this conventional equipment is complemented with a stand-by block 5 with an appropriate short-circuiting device $4_5$ and with two grounding commutating devices $6_1$ and $6_2$ connected on both sides of the stand-by block 5 in the place of constant grounding of the substation.

The stand-by block 5 is placed in the middle point of the circuit in series with the working blocks $1_1$–$1_4$. Stand-by block 5 and its short-circuiting device $4_5$ are constructed in the same way as the working blocks $1_1$–$1_4$ and their short-circuiting device $4_1$–$4_4$.

The substation may operate under various working conditions. Let us consider such conditions, when the stand-by block 5 which is ready for being switched on (e.g. with heated rectifiers) is shunted by its short-circuiting device $4_5$, and the grounding commutating devices are switched on. In this case the substation operates under normal working conditions, with two working blocks in each arm, and the stand-by block 5 is inoperative.

If one of the working blocks, e.g. the block $1_1$ becomes faulty, and this fault cannot be eliminated by tripping with subsequent reclosure, but it requires complete disconnecting of this block for repair, then the known protection device 13 will switch on the short-circuiting device $4_1$, thereby insuring the direct current flow via short-circuiting device $4_1$ past the block $1_1$. Then they will disconnect the faulty block from the alternating current side by means of circuit-breaker 10 (operated by protection devices 13) and from the direct current side by means of disconnect switches 12. The latter disconnection can be made easily, since the block $1_1$ is shunted by short-circuiting device $4_1$ and disconnect switch 12 does not disconnect direct current. After these disconnections the block $1_1$ is disconnected and it can be repaired.

Depending upon the rectifier types, the block construction, the known protection devices, reacting upon current and voltage magnitudes, sense faults in the block (ignition slip, backward ignition, delay of commutation or other faults in rectifiers, fault in converter transformer, puncture of insulation, etc.) and disconnect the block by impulses to the drives of alternating current circuit-breakers, to the controls of the rectifiers, to the switching means of the short-circuiting device, etc., in case the fault cannot be eliminated without block disconnection.

Simultaneously with disconnection of the block $1_1$ an impulse is applied over output circuits of protection devices 13 of the left side of the substation for disconnecting the normally switched-on grounding commutating device $6_1$ (shown in FIG. 1 as connected to the protection device 13). The same impulse is applied from protection device 13 to short-circuiting device $4_5$ of the stand-by block 5 to disconnect the same. All these operations are performed quickly and automatically.

The result of these operations consists in that the stand-by block 5 appears to be inserted into the left pole of the substation in place of the working block $1_1$ which is now disabled for repairs.

If the block $1_3$ of the other pole of the substation happens to be faulty, then in the manner described above, the grounding commutating device $6_2$, switched in the same pole, will be disconnected by means of protection devices 14 of the right side of the substation and short-circuiting device $4_5$ will be disconnected as well, while the stand-by block 5 will replace the block $1_3$.

As can be seen from the above, for putting into operation the stand-by block 5 instead of any faulty block, the protection devices 12 and 14 already present in the substation are used, additional control circuits being added for devices $6_1$, $6_2$ 5 and $4_5$.

Thus the cutting-in of the stand-by block 5 into the middle of the circuit of the two-pole substation makes it possible to effect a rapid replacement of any damaged block therewith, and the transmission line continues operating without reduction in the power being transmitted.

The disconnection of one of the grounding commutating devices $6_1$ and $6_2$ is facilitated due to the fact that it is only the unbalance current that flows therethrough, and also due to the presence of another normally cut in grounding commutating device and the short-circuiting device of the stand-by block.

In a number of cases a high-speed automatic disconnector or a phase of an A.C. circuit-breaker may be used as the earthing commutating devices $6_1$ and $6_2$.

The set described above may be used both in a rectifier and in an invertor substation.

The substation blocks may be made in accordance with any circuit, e.g. a three-phase bridge circuit with one or several bridges connected in parallel.

The short-circuiting devices $4_1$–$4_5$ may be made according to a conventional circuit, e.g., they may be constituted by rectifiers, circuit-breakers, two bridges, one of which serves as a short-circuiting device for the other, or other devices may be resorted to.

Any number of bridges may be employed in the poles of the substation.

The heating of the rectifiers of the stand-by block which provides for their readiness to start functioning may be insured by various means, such as their coupling to an auxiliary power supply source, or a constant coupling of the stand-by block to one of the transmission poles with the voltage and load applied to each block of said pole being reduced. In this case one of the devices, $6_1$ or $6_2$, is normally disconnected, and if any of the blocks happens to be damaged, it becomes disconnected. The voltage and load applied to the remaining operative blocks of said pole are automatically increased to reach the normal value.

The stand-by block may also be used for disabling any working block for the latter to be repaired or inspected, even if no failure or damage has taken place therein.

The probability of trouble occurring in two blocks simultaneously is very small.

On a rectifier substation to the transformer of the stand-by block there may also be coupled the stand-by generator of the electric power station, which normally functions as a booster of the local A.C. mains.

The present invention is intended primarily for high- and super-high voltage direct-current transmission, but it may also be employed for medium or low voltage, e.g. in transport means or other installations which require an increased dependability of converter substations.

Shown in FIG. 2 is another exemplary embodiment of the present invention. Here the stand-by block 5 is inserted into the grounded end of a single-pole substation of direct-current transmission which operates according to the "pole-ground" circuit.

In this case the substation operates in the same way as that shown in FIG. 1, but since there is only one half of the transmission line, the stand-by block replaces the blocks of this half only.

In FIG. 3 a third possible embodiment of the invention is presented, which is used for a two-pole direct current transmission with a zero lead or cable, grounded not within the substation, but outside it. Such a modification of the transmission is employed for the place of constant grounding to be spaced from the substation to preclude the current flow in the ground and damages to the equipment, and also in view of safety reasons.

In this case the grounding commutating devices $6_1$ and $6_2$ are connected to the zero lead or cable 7.

The substation operates in the same manner as those described hereinabove.

Other examples of the application of the present invention are also possible.

For making up the stand-by block, a part of the equipment is employed, which is envisaged in substations known heretofore and not assembled into a block.

Since the stand-by block replaces any of the working blocks inserted into each pole (arm) of the substation, such a replacement results in that in case the external block happens to be faulty, it is replaced by the subsequent one, etc.

Therefore the levels of insulation of the working blocks from the ground should be increased up to the level of insulation of the adjacent block, nearest to the pole outlet, with the exception of the end ones. Practically this involves additional expenditures for additional support insulators of the platforms on which the blocks are arranged. The insulation level of the stand-by block from the ground is made to be the least.

These considerably small additional expenditures provide for: diminishing the shortage in power transmission by as much as several times; improving the dependability of power supply and essentially shortening the time required for eliminating troubles, e.g. in rectifiers, the probability of said troubles increasing with the increase of power and voltage of the transmission and with an increase in the number of rectifiers required therefor; improving the servicing of substations due to the possibility of effecting preventive maintenance of any block without diminishing the power being transmitted.

What is claimed is:

1. A converter substation for direct current power transmission, comprising: converter blocks, each of said blocks being constituted by rectifiers, a transformer and control and protection devices, said blocks being interconnected in series; an additional stand-by converter block, adapted to be switched in for operation and connected in series with said converter blocks in the place of constant grounding of the substantion; and grounding commutating devices shunting said stand-by block from both sides, one of said grounding commutating devices being disconnected in case of failure of any of said converter blocks cut in into the same pole of the substation.

2. A converter substation according to claim 1, wherein the grounding commutating devices are connected to the constant grounding of the substation through an insulated conductor.

3. A converter substation according to claim 1, wherein, with the converter blocks being connected according to a two-pole circuit, the additional stand-by block is inserted into the middle of the converter blocks circuit.

4. A converter substation according to claim 3, wherein the grounding commutating devices are connected to the constant grounding through an insulated conductor.

5. A converter substation according to claim 1, wherein, with the converter blocks being connected into one pole according to a "pole-ground" circuit, the additional stand-by block is placed at the grounded side of the substation.

6. A converter substation according to claim 5, wherein the grounding commutating devices are connected to the constant grounding through an insulated conductor.

References Cited

UNITED STATES PATENTS

| | | | |
|---|---|---|---|
| 2,694,155 | 11/1954 | Bates | 307—64 |
| 3,424,971 | 1/1969 | Stackegard | 321—18 |

FOREIGN PATENTS

| | | |
|---|---|---|
| 1,078,336 | 8/1967 | Great Britain. |

J D MILLER, Primary Examiner

W. H. BEHA, JR., Assistant Examiner

U.S. Cl. X.R.

307—23, 64, 86; 321—27